(12) United States Patent
McCormick et al.

(10) Patent No.: US 9,652,658 B1
(45) Date of Patent: *May 16, 2017

(54) FINGERPRINT CHECK TO REDUCE CHECK FRAUD

(71) Applicant: Wells Fargo Bank, N.A., San Francisco, CA (US)

(72) Inventors: Michael McCormick, Saint Paul, MN (US); Frank Jaffe, Falmouth, ME (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,176

(22) Filed: Feb. 24, 2016

Related U.S. Application Data

(63) Continuation of application No. 14/076,369, filed on Nov. 11, 2013, now Pat. No. 9,305,413, which is a continuation of application No. 12/627,623, filed on Nov. 30, 2009, now Pat. No. 8,582,838.

(60) Provisional application No. 61/118,858, filed on Dec. 1, 2008.

(51) Int. Cl.
  *G06K 9/00* (2006.01)
  *G07D 7/00* (2016.01)

(52) U.S. Cl.
  CPC ..... *G06K 9/00087* (2013.01); *G06K 9/00013* (2013.01); *G07D 7/0006* (2013.01)

(58) Field of Classification Search
  CPC ........... G06K 9/00087; G06K 9/00013; G07D 7/0006

USPC ......................................................... 382/124
See application file for complete search history.

(56) References Cited

U.S. PATENT DOCUMENTS

| | | | |
|---|---|---|---|
| 3,447,818 A | 6/1969 | De Pizzol | |
| 3,928,842 A | 12/1975 | Green et al. | |
| 4,048,618 A | 9/1977 | Hendry et al. | |
| 4,253,086 A | 2/1981 | Szwarcbier | |
| 4,790,564 A * | 12/1988 | Larcher | G06K 9/00006 283/69 |
| 5,444,794 A | 8/1995 | Uhland et al. | |
| 5,659,626 A * | 8/1997 | Ort | G06K 9/00067 382/125 |
| 5,748,780 A | 5/1998 | Stolfo et al. | |
| 5,799,092 A | 8/1998 | Kristol et al. | |
| 5,920,628 A | 7/1999 | Indeck | |
| 5,960,100 A | 9/1999 | Hargrove | |
| 6,030,000 A | 2/2000 | Diamond et al. | |
| 7,349,557 B2 | 3/2008 | Tibor | |
| 7,492,929 B2 | 2/2009 | Itoh et al. | |

(Continued)

OTHER PUBLICATIONS

"Electronic Fingerprint Transmission Specification," Criminal Justice Information Services Division, Jan. 29, 1999, 199 pages.

(Continued)

*Primary Examiner* — John Strege
(74) *Attorney, Agent, or Firm* — Merchant & Gould P.C.

(57) ABSTRACT

A digital image of a surface of a check is received. A check scanning device captures the digital image as the check moves through the check scanning device. A fingerprint is impressed on the surface of the check. A computing system uses the digital image to determine an initial match score for the fingerprint image and an image quality metric to create an adjusted match score. An alert is presented based on the adjusted match score.

20 Claims, 7 Drawing Sheets

(56) References Cited

U.S. PATENT DOCUMENTS

| | | | |
|---|---|---|---|
| 8,582,838 B1* | 11/2013 | McCormick | G07D 7/2033 |
| | | | 382/124 |
| 9,305,413 B1* | 4/2016 | McCormick | G07D 7/2033 |
| 2001/0021274 A1 | 9/2001 | Lee | |
| 2003/0023556 A1 | 1/2003 | Holloway, Jr. | |
| 2003/0128866 A1 | 7/2003 | McNeal | |
| 2004/0125993 A1 | 7/2004 | Zhao et al. | |
| 2008/0031531 A1* | 2/2008 | Hara | G06K 9/0008 |
| | | | 382/237 |
| 2008/0156866 A1 | 7/2008 | McNeal | |

OTHER PUBLICATIONS

"Finger Image-Based Data Interchange Format," ANSI INCITS, Copyright 2004, 35 pages.
"Finger Minutiae Format for Data Interchange," ANSI INCITS, Copyright 2004, 35 pages.
"Information Technology—Biometric Application Programming Interface—Part 1: BioAPI Specification," ISOIIEC, Copyright 2006, 176 pages.
"Registry Documents," Accredited Standards Committee, X9 Incorporated, Mar. 18, 2010, 2 pages.
Li et al., "New Edge-Directed Interpolation," IEEE, Copyright 2001, 7 pages.
Tabassi et al., "Fingerprint Image Quality," NIST, Aug. 19, 2004, 72 pages.

\* cited by examiner

FINGERPRINT CHECK TO REDUCE CHECK FRAUD

BACKGROUND

Check fraud is a major source of loss to financial institutions and businesses. In one typical scenario, a fraudster writes a check for an amount of money that is greater than an amount of money that is in an account against which the check is drawn. In another typical scenario, a fraudster forges a check made out to herself or himself. The fraudster then goes to a branch of the financial institution (i.e., a point-of-transaction) and attempts to obtain cash for the check. If the branch dispenses cash to the fraudster, the financial institution may be unable to recover this money.

To thwart check fraud, many financial institutions have required non-customers or customers without identification to impress their fingerprints on the checks before providing cash. To accomplish this, the person attempting to cash the check would press his or her finger into an ink pad and then press his or her finger onto the check. After the person applied his or her fingerprint to the check, a bank cashier would digitally scan the check and provide cash. Initially, such fingerprinting deterred fraudsters. However, fraudsters eventually realized that the fingerprints were not actually checked. Consequently, the deterrence value of fingerprinting potential fraudsters has decreased over time.

SUMMARY

In one aspect, a method is disclosed comprising: receiving a digital image of a surface of a check, wherein a fingerprint is impressed on the surface of the check, the digital image including a fingerprint image; using the fingerprint image to determine an initial match score for the fingerprint; calculating a fingerprint image quality metric of the fingerprint image, the fingerprint image quality metric being a number based on at least one or more changes made to the fingerprint image; adjusting the initial match score based on the fingerprint image quality metric to create an adjusted match score; and presenting an alert based on the adjusted match score.

In another aspect, a computer-readable storage device is disclosed comprising instructions that, when executed by a processing unit of a computing device, cause the computing device to: receive a digital image of a surface of a check, wherein a check scanning device captures the digital image as the check moves through the check scanning device, wherein a fingerprint is impressed on the surface of the check and the digital image includes a fingerprint image; use the fingerprint image to determine an initial match score for the fingerprint; calculate a fingerprint image quality metric of the fingerprint image, the fingerprint image quality metric being a number based on at least one or more changes made to the fingerprint image; adjust the initial match score based on the fingerprint image quality metric to create an adjusted match score; and cause a workstation device to present an alert when the adjusted match score exceeds an alert threshold.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

As briefly described above, embodiments use fingerprints to detect potential check fraud. The following detailed description explains these technologies with references to the attached drawings. It will be appreciated that the drawings illustrate example implementations and should not be interpreted to represent the sole way of implementing these technologies.

Figure 1:
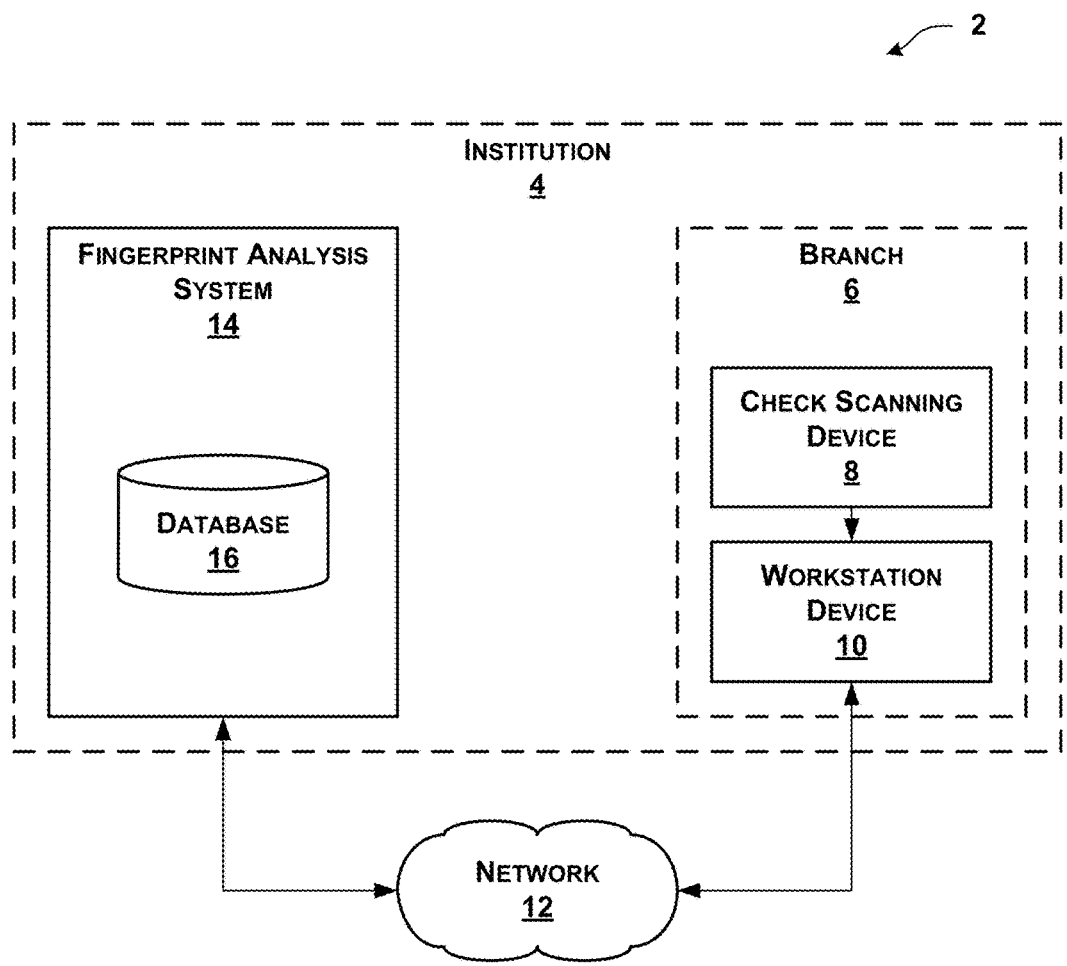
FIG. 1 is a block diagram that illustrates an example system that uses fingerprints to detect potential check fraud.

FIG. 1 is a block diagram that illustrates an example system 2 that uses fingerprints to detect potential check fraud. As used in this disclosure, a "check" is a negotiable instrument for instructing a financial institution to pay a specific amount of a specific currency from a specified demand account. For example, the check may be of the type defined in §3-104 of the Uniform Commercial Code. In this disclosure, the term "check fraud" refers to the illegal acquisition of funds, goods, or services by providing a check which is unauthorized for any reason including, but not limited to, counterfeit, alterations, insufficient signatures, forgeries, stop payments, etc. or is drawn against a demand account that does not contain funds necessary to pay for the funds, goods, or services. The term "fingerprint," as used in this disclosure, refers to an impression of the friction ridges of a last joint of a finger or thumb. As used in this disclosure, the term "cashier" refers to any individual accepting the check in exchange for value. For example, a cashier may be a checkout cashier at a store, a bank teller, a customer service representative, a branch manager, or another type of individual.

As illustrated in the example of FIG. 1, the system 2 comprises an institution 4. The institution 4 is an organization that handles check transactions. In different embodiments, the institution 4 may be a variety of different types of organization. For example, the institution 4 may be a financial institution, a retail establishment, a government bureau, a non-profit organization, or another type of organization.

The institution 4 includes a branch 6. The branch 6 is a location where individuals may present checks to be deposited, to be cashed, or to be offered as a form of payment. For example, the branch 6 may be a bank branch, a retail store, a government office, or another such place.

The branch 6 includes a check scanning device 8. In various embodiments, the check scanning device 8 can be various types of check scanning device. For example, the check scanning device 8 can be a CheXpress CX30 check scanning device manufactured by Digital Check, Corp. of Northfield, Ill., a Magtek Excella check scanning device manufactured by MagTek, Inc. of Seal Beach, Calif., a check scanning device manufactured by RDM Corporation of Waterloo, Ontario, a check scanning device manufactured by Seiko Epson Corporation of Suwa, Japan, a check scanning device manufactured by Eastman Kodak Company of Rochester, N.Y., a check scanning device manufactured by Pertech Resources Inc. of Riverton, Wyo., an IBM 3890 check scanning device manufactured by International Business Machines of Armonk, N.Y., an NCR 7780 check scanning device manufactured by NCR Corporation of Dayton, Ohio, a NDP 2000 check scanning device manufactured by Unisys Corporation, a BancTec X-Series check scanning device, or another type of check scanning device.

In addition, the branch 6 includes a workstation device 10. In various embodiments, the workstation device 10 can be variety of different types of computing systems. As used in this disclosure, a computing system is a set of one or more physical electronic computing devices that operate together to provide a well-defined functionality. For example, the workstation device 10 may be a personal computer, a point-of-sale device, a mainframe terminal, a thin client device, or another type of electronic computing device.

In addition, the institution 4 comprises a fingerprint analysis system (FAS) 14. In various embodiments, the FAS 14 is implemented using a variety of different types of computing systems. For example, in some embodiments, the FAS 14 comprises one or more standalone servers, server blades, server clusters, mainframe computers, intermediate network devices, personal computers, and/or other types of computing systems.

The system 2 also includes a network 12. The network 12 is a communications network that facilitates communication between the branch 6 and the FAS 14. In various embodiments, the network 12 is a variety of different types of electronic communication networks. For example, in some embodiment, the network 12 is a wide-area network, such as the Internet. In other embodiments, the network 12 is a local-area network. The network 12 may include one or more wired or wireless communications links. A variety of networking protocols may be used in the network 12 including, but not limited to, Ethernet, WiFi, WiMax, Hypertext Transfer Protocol (HTTP), SOAP, Transport Control Protocol (TCP), Internet Protocol, and other networking protocols.

In the example of FIG. 1, the FAS 14 comprises a database 16. In various embodiments, the database 16 is implemented in various ways. For example, in some embodiments, the database 16 is implemented as a plurality of physically separate databases. In other embodiments, the database 16 is implemented as a single database. Furthermore, in various embodiments, the database 16 is implemented as a relational database, an object-oriented database, an associative database, or another type of database.

When an individual presents a check to a cashier at the branch 6, the cashier instructs the individual to impress an ink fingerprint on the check. In some embodiments, the individual impresses his or her fingerprint on the front surface of the check. In other embodiments, the individual impresses his or her fingerprint on the rear surface of the check. The individual may place an ink fingerprint on the check by first pressing the individual's finger onto an inkpad, thereby transferring ink onto the individual's finger. The individual then presses that finger onto the check, thereby transferring ink on the friction ridges of the individual's finger onto the check. The ink may be a variety of different colors. For example, the ink may be black, blue, green, brown, purple, or another color. In various embodiments, the cashier instructs the individual to place the individual's fingerprint on various parts of the check. For example, in one example embodiment, the cashier instructs the individual to impress the individual's fingerprint on an endorsement section of a rear surface of the check.

After the individual impresses his or her fingerprint on the check, the cashier or another person passes the check through the check scanning device 8. The check scanning device 8 captures at least a front image and a rear image. The front image is a digital image of the front surface of the check. The rear image is a digital image of the rear surface of the check.

In various embodiments, the check scanning device 8 is implemented in various components. For example, in some embodiments, the check scanning device 8 comprises an imaging system, a transport system, and a track. The imaging system of the check scanning device 8 comprises a lens, lighting, a sensor, and a memory. The transport system of the check scanning device 8 drives rollers that move a check down the track of the check scanning device 8. As the transport system drives the rollers to move the check down the track, the imaging system captures digital images of both sides of the check. In some embodiments, the check scanning device 8 scans both surfaces of the check in a single pass. In other embodiments, the check scanning device 8 uses multiple passes to scan both surfaces of the check. Sensors in the check scanning device 8 identify the start and end of the check. In some embodiments, the check scanning device 8 also contains a Magnetic Ink Character Recognition (MICR) reader. Furthermore, in some embodiments, the check scanning device 8 comprises a franking module that prints on the check as the check moves down the track.

In various embodiments, the check scanning device 8 captures digital images having various characteristics. For example, in some embodiments, the check scanning device 8 captures grayscale images. A grayscale image is a digital image in which the value of each pixel carries only information about the pixel's shade or degree of darkness, but not its hue or color. Furthermore, in various embodiments, the check scanning device 8 captures digital images having a plurality of different resolutions and/or bit-depths. For example, in some embodiments, the check scanning device 8 captures digital images having a fixed native resolution and bit depth. For example, the check scanning device 8 may capture digital images having native resolutions of 300 dots per inch (dpi) and bit depths of 8 bits. In other embodiments, the check scanning device 8 captures digital images having other native resolutions or bit depths (e.g., 32 bits, 24 bits, 16 bits, 1 bit, etc.).

The digital images captured by the check scanning device 8 typically have resolutions of 300 dpi or less. Many commonly used check scanning devices generate grayscale digital images that have resolutions of 240 dpi, 200 dpi, or less. In contrast, United States Federal Bureau of Investigation (FBI) guidelines specify that digital images of fingerprints having resolutions less than 500 dpi are not acceptable as evidence in a court of law. Thus, in some embodiments, the front image and the rear image produced by the check scanning device 8 may not be acceptable as evidence in a court of law.

After generating the front image and the rear image, the check scanning device 8 transfers the front image and the rear image to the workstation device 10. In various embodiments, the check scanning device 8 transfers the front image and the rear image to the workstation device 10 in a variety of ways. For example, in some embodiments, the check scanning device 8 transfers the front image and the rear image to the workstation device 10 via an external device interconnect (e.g., a Universal Serial Bus (USB) cable, a FireWire cable, a serial cable, a parallel port cable, etc.), a wireless network (e.g., a WiFi network, a Bluetooth network, etc.), a wired network (e.g., a local-area network, a wide-area network, etc.), or another communications technology.

When the workstation device 10 receives the front image and the rear image from the check scanning device 8, the workstation device 10 and the FAS 14, operating as a computing system, use the front image or the rear image to calculate a match score. The match score represents an approximate probability that the fingerprint on the check matches a reference fingerprint. The workstation device 10 presents an alert based on the match score. The alert instructs the cashier how to process the check.

To use the check to determine the match score, the workstation device 10 generates a fingerprint image. The fingerprint image is an image that contains the fingerprint. For example, the workstation device 10 may generate the fingerprint image by identifying and isolating a subsection of the front image or the rear image containing the fingerprint.

In some embodiments, the check scanning device 8 generates and transfers other digital images of the check to the workstation device 10. The other digital images of the check may include black-and-white digital images of the check, color digital images of the check, digital images with different bit depths, digital images with different resolutions, and so on. In some such embodiments, the check scanning device 8 generates the fingerprint image from the highest-quality digital image of the front side of the check or the highest-quality digital image of the rear side of the check.

After generating the fingerprint image, the workstation device 10 applies one or more image processing operations to the fingerprint image enhance the fingerprint image. The workstation device 10 then uses the fingerprint image to generate a target fingerprint template. The target fingerprint template represents the fingerprint. As used in this disclosure, a fingerprint template that represents a fingerprint is a set of data that indicates significant features of the fingerprint.

Once the workstation device 10 has generated the target fingerprint template, the workstation device 10 sends a search request to a fingerprint analysis system (FAS) 14 via the network 12. The search request includes the target fingerprint template.

The database 16 stores a plurality of reference fingerprint templates. Each of the reference fingerprint templates represents a reference fingerprint. When the FAS 14 receives the search request, the FAS 14 performs a search process to identify a reference fingerprint that most closely matches the fingerprint on the check.

In some embodiments, the reference fingerprint templates in the database 16 represent the fingerprints of individuals who are suspected of committing check fraud. Furthermore, in some embodiments, the reference fingerprint templates in the database 16 do not include personally identifying information. In other embodiments, the reference fingerprint templates include personally identifying information. The database 16 may include a variety of information in addition to the reference fingerprint templates. For example, the database 16 may include a date, a source location, a capture system, and other information such as match count statistics for each of the reference fingerprint templates. In some embodiments, the database 16 also includes other information, such as fraud history information associated with reference fingerprint templates, cashiers, accounts, locations, or other factors useful in assessing the probability of a fraudulent transaction.

After the FAS 14 calculates the match score, the FAS 14 causes the workstation device 10 to instruct the cashier whether to perform a fraud mitigation action. As used in this disclosure, a fraud mitigation action is an action performed by a person to mitigate loss due to the possibility that a check is fraudulent.

In various embodiments, the FAS 14 causes the workstation device 10 to instruct the cashier whether to perform a fraud mitigation action in various ways. For example, in some embodiments, the FAS 14 calculates a match score. The match score represents an approximate probability that one of the reference fingerprints matches the fingerprint on the check. In this example, the FAS 14 sends a search response to the workstation device 10 via the network 12. The search response indicates the match score. Upon receiving the search response, the workstation device 10 determines whether the match score exceeds one or more alert thresholds. As described herein, the alert thresholds may be based on a variety of factors. For example, if the individual presented the check at a financial institution, an alert threshold may be based on the financial institution's knowledge of rates of fraud at a location where the individual presented the check. If the workstation device 10 determines that the match score does not exceed the alert threshold, the workstation device 10 instructs the cashier to accept the check. On the other hand, if the workstation device 10 determines that the match score exceeds the alert threshold, the workstation device 10 presents an alert that instructs the cashier to perform a fraud mitigation action. In other embodiments, the FAS 14 sends a web page to the workstation device 10. The workstation device 10 displays the web page to the cashier. The web page instructs the cashier whether to perform a fraud mitigation action.

In various embodiments, the workstation device 10 instructs the cashier to perform various types of fraud mitigation actions. For example, in one embodiment, the workstation device 10 instructs the cashier to perform a fraud mitigation action that entails refusing to accept the check. In another embodiment, the workstation device 10 instructs the cashier to perform a fraud mitigation action that entails accepting the check for deposit only and optionally delaying availability of the funds. In yet another embodiment, the workstation device 10 instructs the cashier to perform a fraud mitigation action that entails requiring the individual to provide additional identification, requiring manager approval, or requiring some other action. Many other fraud mitigation actions are possible.

In various embodiments, the workstation device 10 instructs the cashier whether to perform a fraud mitigation action in various ways. For example, the workstation device 10 may display messages on a display device. In other examples, the workstation device 10 may make a particular noise, flash a light, cause a vibration, or otherwise present the alerts. Furthermore, the workstation device 10 may optionally alert other staff (e.g., a security officer) by sending an instant message, an e-mail message or a page.

It should be appreciated that FIG. 1 illustrates merely one embodiment. Many other embodiments are possible. For example, in some embodiments, a device other than the workstation device 10 generates the target fingerprint template to the FAS 14 and/or transmits the target fingerprint template to the FAS 14. In another example, the workstation device 10 transmits the fingerprint image or other digital images of the check to the FAS 14. The FAS 14 applies one or more image processing operations to enhance the fingerprint image or other digital images. Furthermore, in this example, the FAS 14 uses the fingerprint image or other digital images to generate the target fingerprint template.

In yet another example, FIG. 1 illustrates the database 16 as being within the institution 4. However, in other embodiments, the database 16 is shared between multiple institutions. For example, in one example embodiment, the database 16 is a central database provided by a third party service provider who has expertise in fraud or access to fraud data. In this example embodiment, each institution may be able to operate its own local database. However, each of the institutions periodically receive updates from the central database. In this example embodiment, each of the institutions may also periodically send updates to the central database. Alternatively, in this example embodiment, fingerprint analysis systems in each of the institutions may use the central database to access reference fingerprint templates. In another example embodiment, multiple institutions exchange reference fingerprint templates in their databases on a peer-to-peer basis. In embodiments in which the reference fingerprint templates do not include personally identifying information, the sharing of reference fingerprint templates does not pose a privacy risk.

Figure 2:
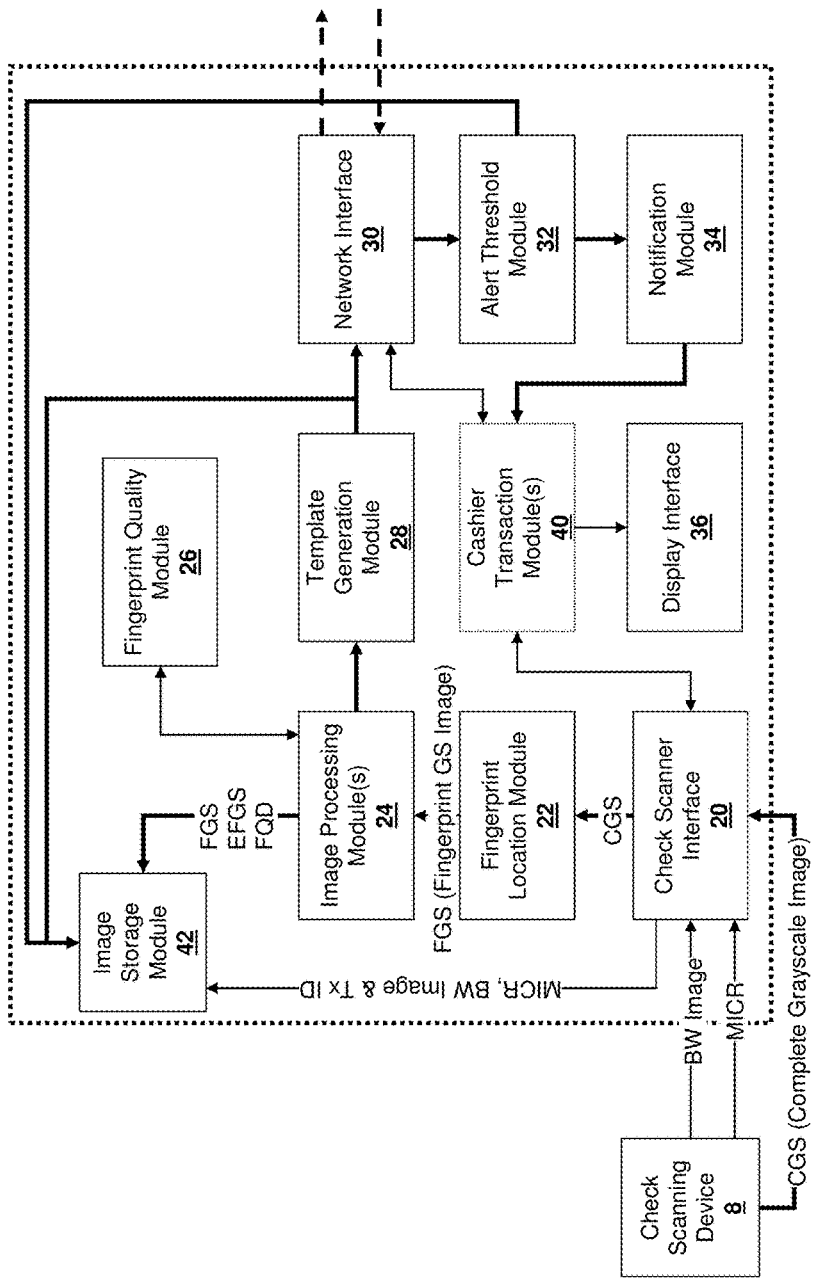
FIG. 2 is a block diagram illustrating example logical components of a workstation device.

FIG. 2 is a block diagram illustrating example logical components of the workstation device 10. As illustrated in the example of FIG. 2, the workstation device 10 comprises one or more instances of a check scanner interface 20, a fingerprint location module 22, an image processing module 24, a fingerprint quality module 26, a template generation module 28, a network interface 30, an alert threshold module 32, a notification module 34, a display interface 36, an image conversion module 38, a cashier transaction module 40, and a local storage module 42. It will be appreciated that the modules illustrated in the example of FIG. 2 are provided as one example among many possible examples that illustrate logical components of the workstation device 10. The functionality of each of these modules is explained below with reference to the example of FIG. 3.

Figure 3:
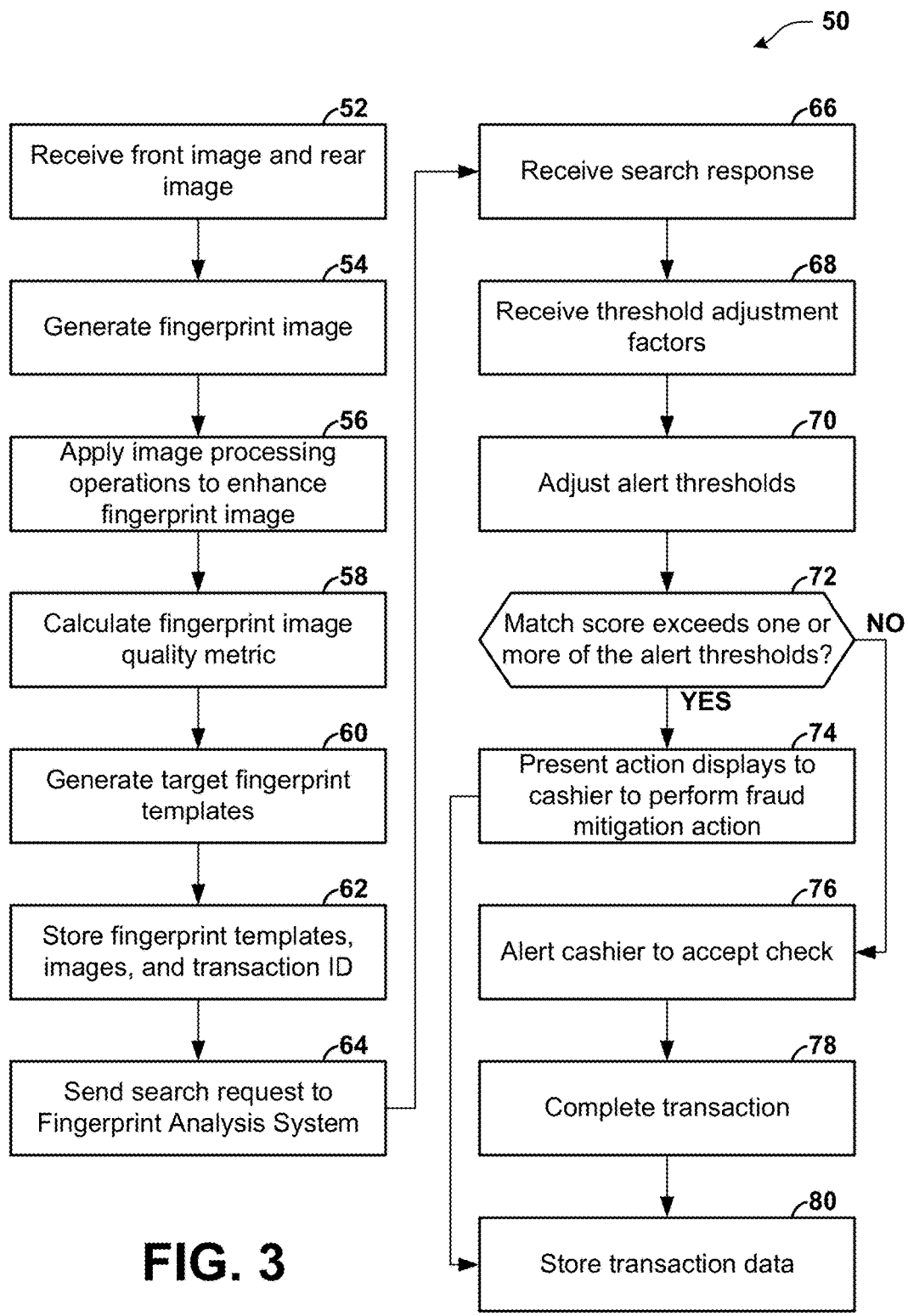
FIG. 3 is a flowchart illustrating an example operation of the workstation device of FIG. 2.

FIG. 3 is a flowchart illustrating an example operation 50 of the workstation device 10. It will be appreciated that the operation 50 is merely one example operation of the workstation device 10. In other embodiments, the workstation device 10 performs many other operations. For example, the workstation device 10 may perform operations with more or fewer operations. Furthermore, steps in the operation 50 may be performed in different orders or by different logical or physical components than are described in the following discussion of FIG. 3.

As illustrated in the example of FIG. 3, the operation 50 starts when the check scanner interface 20 in the workstation device 10 receives a front image and a rear image (52). The front image is a digital image of a front surface of a check and the rear image is a digital image of a rear surface of the same check. A fingerprint of an individual is impressed on one of the surfaces of the check. The check scanner interface 20 receives the front image and the rear image from the check scanning device.

Upon receiving the front image and the rear image, the fingerprint location module 22 in the workstation device 10 generates a fingerprint image (54). The fingerprint location module 22 generates the fingerprint image by identifying and isolating an area in the front image or the rear image containing the fingerprint. In various embodiments, the fingerprint location module 22 generates the fingerprint image in various ways. For example, in some embodiments, the fingerprint location module 22 identifies the area containing the fingerprint through image analysis and segmentation, including through differentiation of the gray levels of pixels where multiple objects are present. Furthermore, in some embodiments, the fingerprint location module 22 uses a fiducial mark on the check to identify the area containing the fingerprint. In other embodiments, the fingerprint location module 22 attempts to identify and isolate a location of the fingerprint from a fixed area on the front image or the rear image. In these implementations, the fingerprint location module 22 generates an error if the fixed area does not contain a fingerprint or if the fixed area contains only part of a fingerprint.

Next, the image processing module 24 in the workstation device 10 applies image processing operations that enhance the fingerprint image (56). In various embodiments, the image processing module 24 applies various image processing operations that enhance the fingerprint image. For example, in some embodiments, the image processing module 24 applies image processing operations enhance the fingerprint image by reducing artifacts in the fingerprint image. These artifacts may include blurring of the fingerprint image caused by low resolution scanner equipment. Other artifacts are caused by movement of the check through the check scanning device 8. Example types of artifacts caused by movement of the check through the check scanning device 8 include horizontal stretching or compression of the fingerprint image due to uneven speed of the check through the check scanning device 8, inconsistent distance between the image sensor of the check scanning device 8 and the check, uneven insertion of the check into the check scanning device 8, bumps in the fingerprint image due to perforation or hanging bits of paper that cause the check to move vertically or horizontally as the check moves through the check scanning device 8, poor focus by the check scanning device 8, and so on. Other types of artifacts in the fingerprint image are be caused by dirt, streaks and bands, uneven exposures, framing errors, upside down insertion of the check into the check scanning device 8, backward insertion of the check into the check scanning device 8, retention of background image data, dirt or scratches on a lens of the check scanning device 8, and so on. Further artifacts are caused by the fingerprinting process itself, such as uneven application of ink, smearing, bleeding, improper orientation, and so on. Furthermore, in some embodiments, the image processing module 24 applies image processing operations to sharpen edges, fill in voids within the interiors of features, and to complete features which are partially present due to, for example, uneven pressure when the fingerprint is applied to the check.

In some embodiments, a fiducial mark is applied to the check. The fiducial mark is a set of marks that form a known shape. In various embodiments, the fiducial mark has various forms. For example, in some embodiments, the fiducial mark is a set of marks indicating the corners of a square. In other embodiments, the fiducial mark is a complete rectangular box, a circle, an oval, a triangle, or another shape. In some embodiments, the fiducial mark surrounds the fingerprint. In other embodiments, the fiducial mark does not surround the fingerprint or otherwise indicate a location of the fingerprint.

The fiducial mark always has the same known characteristics. Consequently, the image processing module 24 is able to use the fiducial mark to calculate quality information about the digital image. Furthermore, the image processing module 24 use the quality information to determine which image processing operations to use to enhance the fingerprint image. In some embodiments, the image processing module 24 uses the quality information to compensate for degradation of the digital image caused by a process used to capture the digital image. For example, the image processing module 24 may use the quality information to compensate for variations in the horizontal transport speed of the check through the check scanning device 8.

In various embodiments, the fiducial mark has various known characteristics. For example, in some embodiments, the known characteristics of the fiducial mark include the width of the fiducial mark and the height of the fiducial mark. Because the fiducial mark has a known width and height, the image processing module 24 is able to more accurately detect variations in the horizontal transport speed of the check through the check scanning device 8. Consequently, the image processing module 24 may be able to more accurately correct the fingerprint image to compensate for such variations. Moreover, because the fiducial mark always has the same size and characteristics, the image processing module 24 may use the fiducial mark to detect vertical movement of the check as the check passed through the check scanning device 8 and more accurately identify and compensate for such vertical movement.

In various embodiments, the fiducial mark is applied to the check at various times and by various people or machines. For example, in some embodiments, a cashier uses an ink stamp to apply the fiducial mark to the check. In other embodiments, the fiducial mark is pre-printed on the check.

In some embodiments, no fiducial mark is applied to the check. In some such embodiments, an endorsement portion of the check has multiple light gray background lines that guide the writing of an endorser. These background lines are designed to drop out in a black-and-white image of the check, but are visible in a grayscale image of the check. Because these background lines are a fixed distance apart and perpendicular to the long edges of the check, the image processing module 24 is able to use an image of the background lines to detect variations in the horizontal transport speed of the check through the check scanning device 8 as well as to detect skew in the image. Because the image processing module 24 is able to detect variations in the horizontal transport speed of the check when the check was being imaged, the image processing module 24 is able to apply an image processing operation to modify the fingerprint image to compensate for the variations in the horizontal transport speed of the check. In some embodiments, the image processing module 24 applies an image processing operation that removes the background lines from the fingerprint image. In addition, if the signature of the endorser impinges upon the fingerprint, the image processing module 24 applies an image processing operation to remove the signature. Because the fingerprint image is not intended for use as evidence in criminal prosecution, such digital manipulation of the fingerprint image is acceptable, so long as such digital manipulation does not change the fingerprint image in unknown or un-reproducible ways.

Furthermore, in some embodiments, the image processing module 24 detects the approximate dimensions of a check when the check scanning device 8 scans the check. Many checks are of a standard size. For example, many checks are 2.75 inches by 6 inches, 3.5 inches by 8.5 inches, or 3.67 inches by 8.5 inches. Tolerances for standard check sizes are typically less than 1/16 of an inch. In various embodiments, the check scanning device 8 is able to scan and process checks of various sizes, including standard and non-standard sizes. The image processing module 24 compares the detected dimensions of the check to the standard check to determine a likely real size of the check. The image processing module 24 then compares the sizes of the front image and the rear image with the likely real size of the check to detect an overall amount of stretch or compression applied to the front image and the rear image. The image processing module 24 then adjusts the fingerprint image to compensate for the overall amount of stretch or compression applied to the front image or the rear image.

In some embodiments, the image processing module 24 performs an image processing operation that uses interpolation to enhance the fingerprint image. Typical fingerprint ridges follow generally predictable contours within small regions. Variability among fingerprints is found in macro regions. Except at ridge bifurcation points, adjacent dark pixels in the fingerprint image generally form part of a single continuous dark ridge line. In other words, fingerprint ridges seldom intersect. The fact that fingerprint ridges follow generally predictable contours within small regions may make fingerprints more amenable to interpolation than other types of images. Interpolation is a process of inserting a new pixel between previously adjacent pixels in an original image and adjusting an intensity of the new pixel based on the intensities of the adjacent pixels of the original image. For example, if a pixel has high intensity and all pixels surrounding the pixel have low intensities, the interpolation operation reduces the intensity of the pixel. By interpolating intensities of pixels in this manner, the image processing operation may increase the effective resolution of the fingerprint image. For example, the image processing operation may increase the effective resolution of the fingerprint image from 300 dpi to 600 dpi. The fingerprint image that results from performing this image processing operation may be suitable for use in biometric matching algorithms.

Furthermore, in some embodiments, the image processing module 24 performs an image processing operation that uses edge detection to sharpen details of the fingerprint image. In such embodiments, the image processing operation detects lines and edges of objects (i.e., adjacent pixels of the same intensity in one direction only). Detection and sharpening of edges may be useful when the fingerprint image is scaled up.

In some embodiments, the image processing module 24 applies an image processing operation that scales the fingerprint image such that the fingerprint image has a resolution that is expected by a fingerprint template generation process. For example, the image processing module 24 may scale fingerprint images to a resolution of 600 dpi.

Furthermore, in some implementations, the image processing module 24 applies a noise reduction filter image processing operation to the fingerprint image after the image processing module 24 applies the interpolation image processing operation to the fingerprint image. The noise reduction filter image processing operation may reduce any artificial Gaussian blurring introduced by the interpolation image processing operation.

Referring again to FIG. 3, after the image processing module 24 applies the one or more image processing operations to the fingerprint image, the fingerprint quality module 26 calculates a fingerprint image quality metric of the fingerprint image (58). The fingerprint image quality metric is a measure of the expected accuracy of the fingerprint image in representing the individual's actual fingerprint. In one example implementation, the fingerprint image quality metric is a number based on the amount of changes made to the fingerprint image during the image processing operations. In addition, the fingerprint image quality metric may be based on other factors including, but not limited to, a known or calculated quality of the check scanning device 8, an original resolution of the front image and the rear image, and other factors.

After the fingerprint quality module 26 calculates the fingerprint image quality metric of the fingerprint image, the template generation module 28 generates a target fingerprint template from the fingerprint image (60). The target fingerprint template is a fingerprint template that represents the fingerprint in the fingerprint image. In some embodiments, the template generation module 28 is pluggable. In other words, an administrator can plug in various software modules to act as the template generation module 28. Each of software modules can be implemented differently. Each of the software modules may implement an application programming interface (API) for biometric service providers. In some embodiments the API is based on the industry-standard BioAPI specification. The workstation device 10 invokes one or more methods of the API to cause the template generation module 28 to generate the target fingerprint template.

In various embodiments, the target fingerprint template is formatted in various ways. For example, in some embodiments, the format of the target fingerprint template is proprietary. In other embodiments, the format of the target fingerprint template is based on the International Committee for Information Technology Standards (INCITS) 378 standard for fingerprint templates. Furthermore, in some embodiments, the target fingerprint template is encrypted. In one example embodiment, the target fingerprint template is encrypted such that the encrypted target fingerprint template complies with American National Standards Institute (ANSI) standard X9.84.

In some embodiments, the template generation module 28 generates multiple target fingerprint templates for a single fingerprint on a single check. In such embodiments, the template generation module 28 generates a target fingerprint template from the fingerprint image before the image processing module 24 applies some or all of the image processing operations to the fingerprint image. For example, the template generation module 28 may generate a first target fingerprint template from the fingerprint image before the image processing module 24 applies any image processing operations to the fingerprint image, a second target fingerprint template from the fingerprint image after the image processing module 24 applies an image processing operation to the fingerprint image that removes interfering marks (e.g., lines, background patterns, etc.), a third target fingerprint template from the fingerprint image after the image processing module 24 applies an image processing operation that adjusts for transport artifacts, and a fourth target fingerprint template after the image processing module 24 applies an interpolation operation to the fingerprint image, and so on.

After generating the target fingerprint template, the image storage module 42 stores the original fingerprint image, the enhanced fingerprint image, the fingerprint image quality metric, the target fingerprint templates, and other information (62). In various embodiments, the image storage module 42 stores the fingerprint image at a variety of locations. In a first example embodiment, the image storage module 42 stores the fingerprint image at the database 16. It may be possible to recalculate a new fingerprint template based on additional information obtained from the check scanning device 8 in subsequent scans or improvements in image processing operations over time. In this first example embodiment, the image storage module 42 stores the fingerprint image until the end of the business day before transferring the fingerprint image to the database 16. In a second example embodiment, the image storage module 42 stores the fingerprint image at a storage device at the branch 6.

Next, the network interface 30 sends a search request to the FAS 14 via the network 12 (64). The search request includes the target fingerprint template. In some embodiments, the network interface 30 sends additional information to the FAS 14. For example, in some example embodiments, the network interface 30 sends additional types biometric information to the FAS 14. For example, in some embodiments, the network interface 30 sends a target facial scan template to the FAS 14. The target facial scan results from scanning the individual's face. Furthermore, in some embodiments, the network interface 30 sends a target retinal scan template to the FAS 14. The target retinal scan template results from scanning one or more of the individual's retinas.

Subsequently, the network interface 30 receives a search response (66). In the example of FIG. 3, the search response includes a match score. The match score represents an approximate probability that a fingerprint on the check matches a reference fingerprint represented by a reference fingerprint template in the database 16. Furthermore, the network interface 30 receives threshold adjustment factors (68). The threshold adjustment factors indicate adjustments to be made to alert thresholds used by the workstation device 10 to determine whether to present alerts. After receiving the match score and the threshold adjustment factors, the alert threshold module 32 adjusts the alert thresholds based on the threshold adjustment factors (70).

The workstation device 10 then determines whether the match score exceeds one or more of the alert thresholds (72). In some embodiments, the workstation device 10 uses different alert thresholds in different situations. For example, in some embodiments, the notification module 34 uses a lower alert threshold for checks with higher monetary amounts and a higher alert thresholds for checks with lower monetary amounts. Furthermore, in some embodiments where the institution 4 is a financial institution, the notification module 34 uses a lower alert threshold for individuals who have local home addresses and a higher alert threshold for individuals who have distant home addresses. Furthermore, in some embodiments, the notification module 34 uses different alert thresholds depending on information known about the individual, a type of account against which the check is drawn, fraud rates for the account against which the check is drawn, fraud rates at the branch 6, fraud rates for the institution 4 as a whole, fraud rates in a geographical area, or other factors.

If the match score exceeds one or more alert thresholds ("YES" of 72), the notification module 34 instructs the cashier transaction module 40 to use the display interface 36 to present one or more alerts that instruct a cashier to perform a fraud mitigation action (74). In various embodiments, the one or more alerts instruct the cashier to perform various fraud mitigation actions. For example, in some embodiments, the one or more alerts instruct the cashier to perform a fraud mitigation action that entails accepting the check, but segregating the check for subsequent analysis. By segregating checks based on suspicious fingerprints, the institution 4 may be able to retain the checks as physical evidence only in situations where retaining the checks would likely be useful. This may be more cost effective than attempting to retain as physical evidence all received checks.

If the match score does not exceed any of the alert thresholds ("NO" of 72), the notification module 34 instructs the cashier transaction module 40 to use the display interface 36 to present an alert that instructs a cashier to accept the check (76). After presenting the alert that instructs the cashier to accept the check, the cashier transaction module 40 completes the transaction per the business processes of the institution 4 (78). In various embodiments, the cashier transaction module 40 completes the transaction in various ways. For example, in some embodiments where the check is accepted for cashing, deposit, or otherwise to satisfy a transaction, the cashier transaction module 40 performs an operation to clear the check. For example, the cashier transaction module 40 may convert the check into an ACH transaction to clear the check. In another example, the check is cleared by exchanging the black-and-white digital images of the check. In a third example, the check is cleared using a paper-exchange method.

After the workstation device 10 presents the alert to perform the fraud mitigation action in step 78 or after the cashier transaction module 40 completes the transaction in step 76, the image storage module 42 stores transaction data (80). In various embodiments, the transaction data include various types of data. For instance, in some embodiments, the transaction data includes the MICR line of the check, an amount of the check, an identifier of the branch 6, an identifier of the transaction, information about the type of transaction (e.g., deposit, cash, purchase, etc.), information about the party conducting the transaction, and other information about the transaction in which the check is being used.

Furthermore, in some embodiments, the transaction data includes transaction identifiers and image identifiers. The transaction identifiers uniquely identify the transaction and the image identifiers uniquely identify the fingerprint image. Other records in the database 16 use the image identifier to refer to the fingerprint image. In some embodiments, the image storage module 42 generates a database entry for a transaction. The database entry includes an image identifier that identifies the fingerprint image. In this way, a person reviewing the transaction is able to access a digital image of a fingerprint applied to the check used in the transaction. Such a review may be conducted in situations where a transaction involving the check is subsequently determined to be fraudulent.

Figure 4:
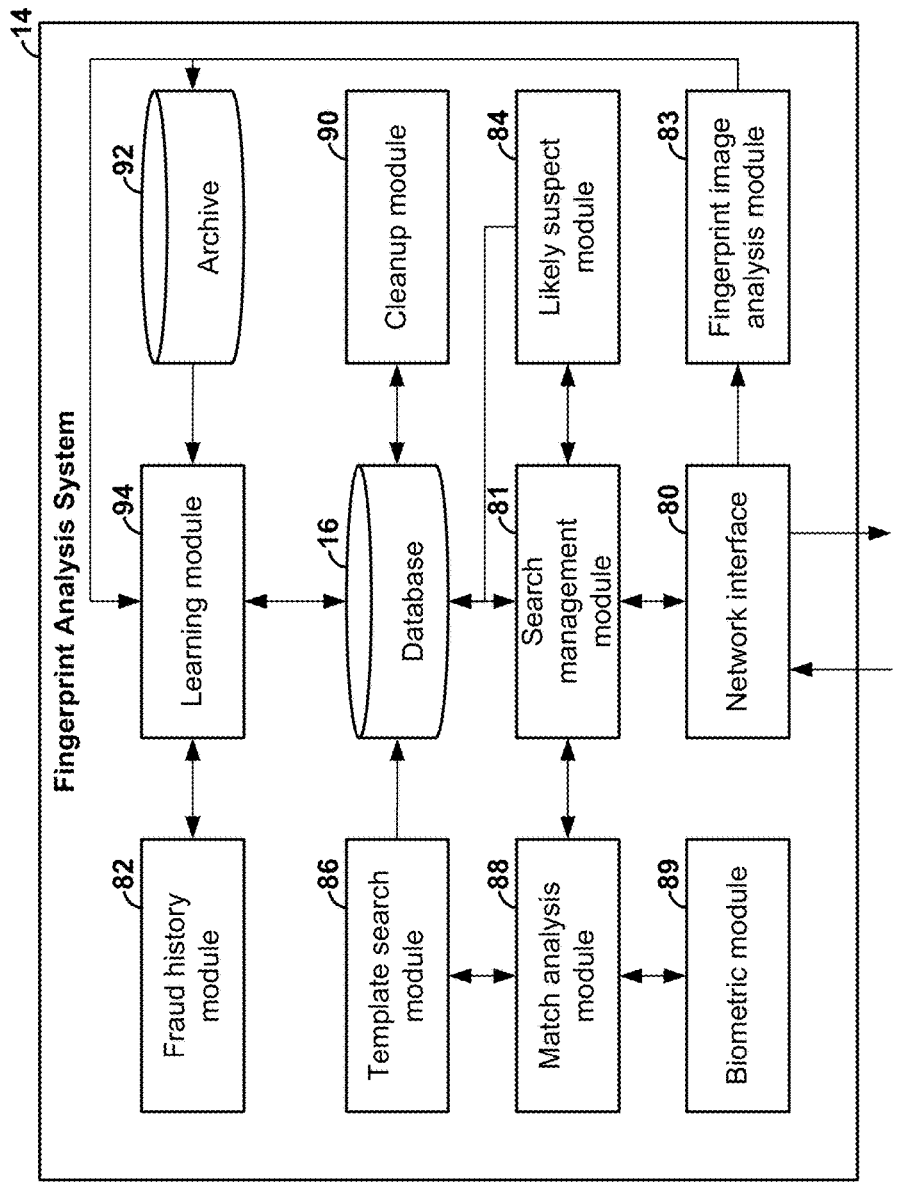
FIG. 4 is a block diagram illustrating example logical components of a fingerprint analysis system.

FIG. 4 is a block diagram illustrating example logical components of the FAS 14. As illustrated in the example of FIG. 4, the FAS 14 comprises a network interface 80, a search management module 81, a fraud history module 82, a fingerprint image analysis module 83, a likely suspect search module 84, a template search module 86, a match analysis module 88, and one or more pluggable biometric modules 89. The network interface 80 enables the FAS 14 to send and receive information on the network 12. The search management module 81 controls a search process by managing the time and resources available to the search process. For example, in some embodiments, the search management module 81 manages how many simultaneous search processes to employ. In addition, the search management module 81 determines when a search process is completed by comparing match results with a search-ending threshold value. The likely suspect search module 84 performs a preliminary search of the reference fingerprint templates in the database 16 associated with the likely suspects to identify a prioritized set of reference fingerprint templates that are possible matches to a target fingerprint template. The template search module 86 determines whether the target fingerprint template matches reference fingerprint templates in the database 16 sufficiently to warrant further analysis of the target fingerprint template. The match analysis module 88 conducts this further analysis of the fingerprint templates and outputs a possible match score for the fingerprint templates that it analyzes. To do this, the match analysis module 88 uses the biometric module(s) 89 to perform biometric template comparisons. The functionalities of the fraud history module 82, the likely suspect search module 84, the template search module 86, and the match analysis module 88 are explained below with reference to FIG. 5.

In addition, the FAS 14 comprises a cleanup module 90. The cleanup module 90 determines whether the database 16 has grown too large. In various embodiments, the cleanup module 90 determines whether the database 16 has grown too large based on a various criteria. For instance, the cleanup module 90 may determine that the database 16 has grown too large when the number of reference fingerprint templates in the database 16 exceeds a given number, when the total size of all reference fingerprint templates in the database 16 exceeds a given parameter, when search processes fail to complete within a given time, and/or other criteria.

When the database 16 grows too large, the cleanup module 90 identifies reference fingerprint templates in the database 16 that are not essential to the effective operation of the FAS 14. The cleanup module 90 identifies reference fingerprint templates that are not essential to effective operation of the FAS 14 based on various criteria. For instance, in some example embodiments, the cleanup module 90 identifies reference fingerprint templates that have not been associated with fraud for a given period of time (e.g., seven years) as not essential to effective operation of the FAS 14. The cleanup module 90 moves the identified reference fingerprint templates to an archive 92. In some embodiments, removing reference fingerprint templates from the database 16 makes searches of the database 16 faster.

The system 2 attempts to support conflicting objectives: high degrees of accuracy and high performance throughput. Accuracy is measured by low false match rates and low false non-match rates. High throughput improves response times of the FAS 14 so that cashiers and customers are not inconvenienced by long wait times for fingerprint extraction, enhancement, and matching. In some embodiments, the fraud history module 82, the fingerprint image analysis module 83, and a learning module 94 help balance these objectives. The fraud history module 82 manages fraud incident history data to update the database 16 with information used to identify individuals most likely to commit fraud at the branch 6. The fingerprint image analysis module 83 performs additional analysis of fingerprint images stored in the archive 92 to identify fingerprint characteristics that caused false matches and false non-matches to identify image processing operations that caused positive or negative effects.

The learning module 94 performs a learning process that seeks to reduce a rate of false matches and false non-matches. A false match occurs when a fingerprint does not match a reference fingerprint in the database 16, but the FAS 14 causes the workstation device 10 to instruct the cashier to perform a fraud mitigation action. A false non-match occurs when a fingerprint matches a reference fingerprint in the database 16, but the FAS 14 does not cause the workstation device 10 to instruct the cashier to perform a fraud mitigation action.

In various embodiments, the learning module 94 performs various learning processes. For example, in some embodiments, the learning module 94 performs a learning process that improves a process for identifying likely suspects, improves reference fingerprint templates in the database 16, and improves the accuracy of the template search module 86. To accomplish this, the learning module 94 monitors matches and non-matches to try to determine whether or not the match scores provided by the FAS 14 were correct. In some embodiments, the learning process runs at times when the FAS 14 is less busy, such as after business hours. In one example embodiment, the learning module 94 uses extensible markup language (XML) records generated by the workstation device 10 to perform this analysis. The XML records contain transaction data and fingerprint images.

When the FAS 14 determines that the database 16 does not contain a reference fingerprint template that matches a target fingerprint template of a check, but it is later determined that the check was fraudulent, the learning module 94 determines whether the check is the work of a new fraudster or was a false non-match. When the check is the work of a new fraudster, the learning module 94 adds the target fingerprint template to the database 16. In various embodiments, the learning module 94 performs various actions when a false non-match occurs. For example, in some embodiments, the learning module 94 adjusts the reference fingerprint templates on the fingerprint to improve the odds of future prints matching against the reference fingerprint template. In various embodiments, the learning module 94 adjusts the reference fingerprint templates in various ways. In one example, it is determined that a given reference fingerprint template represents the same fingerprint as a target fingerprint template, but the FAS 14 did not determine that the given reference fingerprint template represents the same fingerprint as the target fingerprint template. In this example, the learning module 94 adjusts the reference fingerprint templates by replacing the given reference fingerprint template with the target fingerprint template. In another example, it is determined that a given reference fingerprint template represents the same fingerprint as a target fingerprint template, but the FAS 14 did not determine that the given reference fingerprint template represents the same fingerprint as the target fingerprint template. In this other example, the learning module 94 adjusts the reference fingerprint templates by adapting the given reference fingerprint template to resemble the target fingerprint template. Furthermore, when a false non-match occurs, the learning module 94, in some embodiments, adjusts the indexing for likely suspects to improve the odds of correctly prioritizing reference fingerprint templates for evaluation. The learning module 94 performs these adjustments using algorithms and automated processes.

When the FAS 14 determines that the database 16 contains a reference fingerprint template that matches a target fingerprint template of a check, but it is later determined that the check was not fraudulent (i.e., either a false match occurred, or a known fraudster presented a non-fraudulent check), the fingerprint image analysis module 83 reanalyzes the fingerprint and provides information to the learning module 94 that identifies a cause of the false match. If appropriate, the learning module 94 adjusts the reference fingerprint template to reduce the possibility of future false matches against the reference fingerprint template. In general, the learning module 94 adjusts reference fingerprint templates in cases where reference fingerprint template fidelity can be improved based on newly acquired fingerprint templates, regardless of whether the check in question was found fraudulent.

In some embodiments, the learning module 94 evaluates whether particular types of check scanning devices tend to produce fingerprint images having higher or lower rates of false matches or false non-matches. If a particular type of check scanning device produces fingerprint images having high rates of false matches or false non-matches, the learning module 94 configures the match analysis module 88 to lower the probability that fingerprints captured by the particular type of check scanning device match fingerprints represented by the reference fingerprint templates. If a particular type of check scanning device produces fingerprint images having low rates of false matches or false non-matches, the learning module 94 configures the match analysis module 88 to raise the probability that fingerprints captured by the particular type of check scanning device match fingerprints represented by the reference fingerprint templates.

Similarly, in some embodiments, the learning module 94 evaluates whether individual check scanning devices tend to produce fingerprint images having higher or lower rates of false matches or false non-matches. If an individual check scanning device produces fingerprint images having high rates of false matches or false non-matches, the learning module 94 configures the match analysis module 88 to lower the probability that fingerprints captured by the individual check scanning device match fingerprints represented by the reference fingerprint templates. If an individual check scanning device produces fingerprint images having low rates of false matches or false non-matches, the learning module 94 configures the match analysis module 88 to raise the probability that fingerprints captured by the individual check scanning device match fingerprints represented by the reference fingerprint templates.

The learning module 94 also evaluates whether image processing operations performed by the workstation device 10 increase or decrease the likelihood of false matches or false non-matches by having the fingerprint image analysis module 83 perform detailed analysis of the impact of individual image processing operations on the fingerprints. In some embodiments, when the learning module 94 determines that an image processing operation increases the likelihood of false matches or false non-matches, the learning module 94 causes the workstation device 10 to discontinue use of the image processing operation or adjust parameters of the image processing operation.

In some embodiments, the FAS 14 provides an interoperable XML-based API for integration into back office check processing. This API allows transaction data to be submitted along with details of a related fraud incident. Example details of a fraud incident include a type of the fraud, a date of the fraud, a location of the fraud, an amount of the fraud, and so on. In addition, the API allows an item identifier to be submitted. In some embodiments, the item identifier is encrypted via a one-way salted hash (e.g., SHA256 or stronger).

In some embodiments, when an improved technique of generating fingerprint templates is installed on the FAS 14, the learning module 94 reprocesses the fingerprint images of each of the reference fingerprint templates in the database 16 to generate improved reference fingerprint templates.

Figure 5:
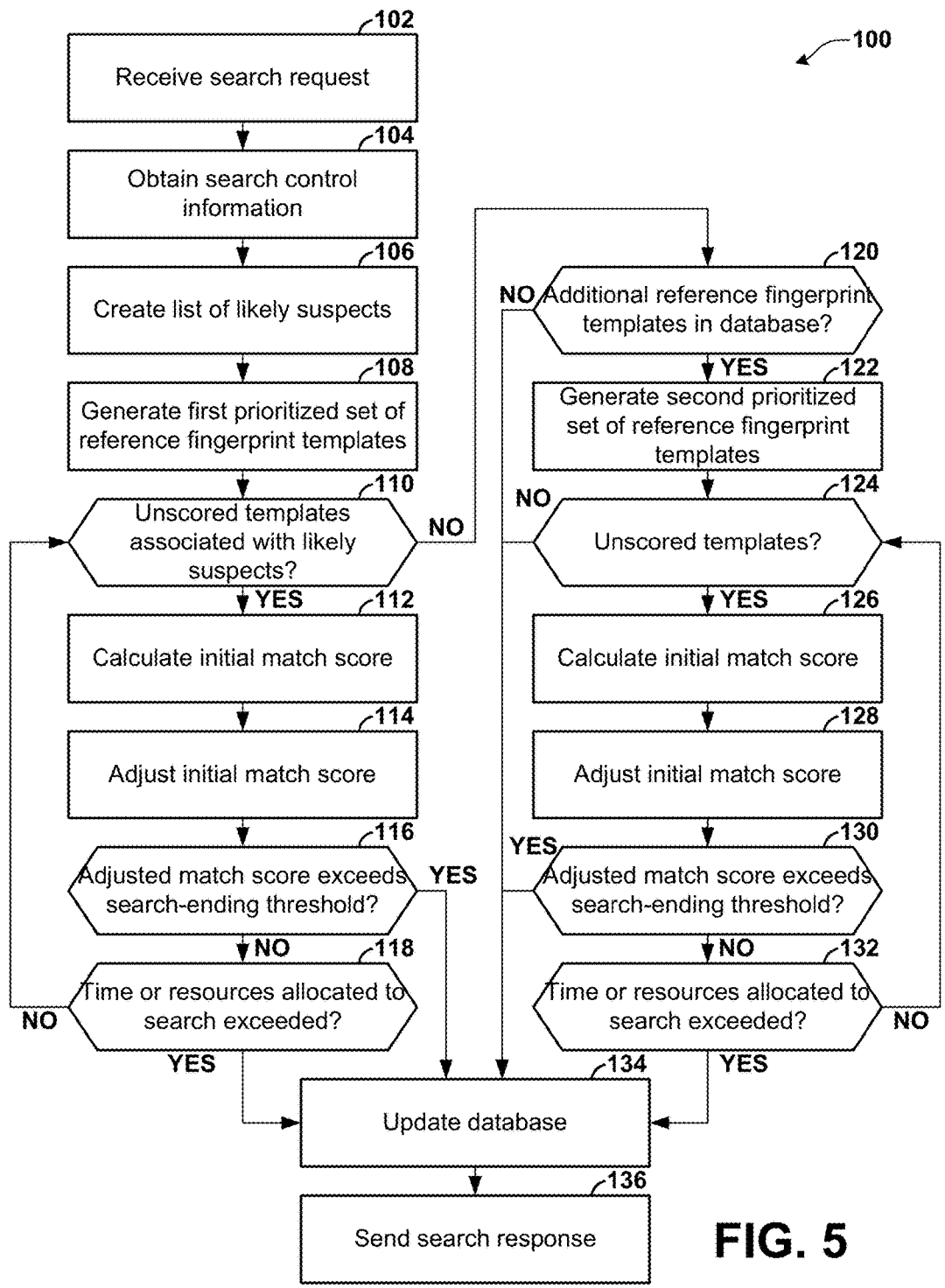
FIG. 5 is a flowchart illustrating an example operation of the fingerprint analysis system of FIG. 4.

FIG. 5 is a flowchart illustrating an example operation 100 of the FAS 14. It will be appreciated that the operation 100 is merely one example operation of the FAS 14. The FAS 14 may perform many other operations. For instance, the FAS 14 may perform operations with more or fewer operations. Furthermore, steps in the operation 100 may be performed by different logical or physical components or in different orders than are described in the following discussion of FIG. 5.

Initially, the network interface 80 in the FAS 14 receives a search request from the workstation device 10 at the branch 6 (102). The search request includes a target fingerprint template and additional information. After receiving the search request, the search management module 81 obtains search control information from the database 16

(104). The search management module 81 uses the search control information to control a search process. In various embodiments, the search control information includes various types of information. For example, in some embodiments, the search control information indicates an allowable time to devote to the search process, resources to devote to the search process, a search-ending threshold, threshold adjustment factors, and so on. Example threshold adjustment factors include recent branch fraud information, image quality factors, and other information.

The likely suspect search module 84 uses the search control information to search the database 16 and create a list of likely suspects (106). The likely suspects are individuals who are most likely to commit fraud at the branch 6.

After the likely suspect search module 84 identifies the list of likely suspects, the template search module 86 performs a template index search on the list of likely suspects (108). The template index search filters the reference fingerprint templates associated with the likely suspects by those whose indexes indicate that the reference fingerprint templates may match the target fingerprint template. In this way, the template search module 86 identifies a first prioritized set of reference fingerprint templates that are possible matches to the target fingerprint template.

The search management module 81 then determines whether there are any unscored reference fingerprint templates in the first prioritized set of reference fingerprint templates (110). Initially, each reference fingerprint template in the first prioritized set of reference fingerprint templates is unscored. If there are one or more unscored reference fingerprint templates in the first prioritized set of reference fingerprint templates ("YES" of 110), the match analysis module 88 uses the biometric module 89 to calculate an initial match score by comparing the target fingerprint template and a selected reference fingerprint template (112). The selected reference fingerprint template is the highest-priority unscored reference fingerprint template in the first prioritized set of reference templates. The initial match score represents a probability that the target fingerprint template is a match to the highest-priority unscored reference fingerprint template. In one example implementation, the template search module 86 uses partial fingerprint template triangles and flash indexing to calculate the initial match score. Flash indexing is described in the article "Fingerprint Matching Using Transformation Parameter Clustering", Germain et al; IBM Computational Science & Engineering, the entirety of which is hereby incorporated by reference. In one example embodiment, calculating the initial match score involves comparing the number and relationship of ridges, whorls, and bifurcations.

In some embodiments, the biometric module 89 implements an API is based on an industry standard BioAPI biometric service provider interface. The match analysis module 88 uses the biometric module 89 by invoking one or more methods of the API. The biometric module 89 encapsulates a biometric algorithm. The biometric algorithm compares the target fingerprint template to the selected reference fingerprint template and returns an initial match score. The biometric module 89 is a pluggable module. Because the biometric module 89 is a pluggable module, the FAS 14 is able to function independently of the biometric algorithm or biometric manufacturer chosen in any given implementation of the biometric module 89.

In some example embodiments, the FAS 14 includes multiple implementations of the biometric module 89. In such embodiments, each of the implementations of the biometric module 89 generates an initial match score. The match analysis module 88 uses a mathematical process of weighted averaging to combine the initial match scores. In some embodiments, weights associated with the implementations of the biometric module 89 are self-adjusting based on past performance (accuracy) of each of the implementations of the biometric module 89. In embodiments where the FAS 14 is running on a computing device with multiple processing units, each of the implementations of the biometric module 89 may execute in parallel on a different one of the processing units.

After the match analysis module 88 uses the biometric module 89 to calculate the initial match score, the match analysis module 88 adjusts the initial match score, thereby generating an adjusted match score for the selected reference fingerprint template (114). In various embodiments, the match analysis module 88 adjusts the initial match score based on various factors. For example, the match analysis module 88 may adjust the initial match score based on a quality of the fingerprint that was used to create the reference fingerprint template. In another example, the match analysis module 88 adjusts the initial match score based on the fingerprint image quality metric of the fingerprint image that was used to create the target fingerprint template. In yet another example, the match analysis module 88 adjusts the initial match score based on characteristics of the check scanning device 8. In yet another example, the workstation device 10 sends one or more other target biometric templates (e.g., target facial templates, target retinal templates, etc.) to the FAS 14. In this example, the match analysis module 88 adjusts the initial match score based on whether the other target biometric templates correspond to an individual associated with the selected reference fingerprint template. In yet another example, the match analysis module 88 adjusts the initial match score based on the number of past false matches associated with the selected reference fingerprint template. In yet another example, the match analysis module 88 adjusts the initial match score based on the number of past false non-matches associated with the selected reference fingerprint template. In yet another example, the match analysis module 88 adjusts the initial match score based on a history of fraud (e.g., a number of incidents of fraud) associated with the selected reference fingerprint template. In yet another example, the match analysis module 88 adjusts the initial match score based on a chronology of fraud (e.g., how recently fraud has happened) associated with the selected reference fingerprint template. In other examples, the match analysis module 88 adjusts the initial match score based on a variety of other factors.

Once the match analysis module 88 has generated the adjusted match score, the search management module 81 compares the adjusted match score with the search-ending threshold (116). When the adjusted match score exceeds the search-ending threshold, the selected reference fingerprint template is deemed to be a sufficiently close match to the target fingerprint template. The search-ending threshold may be set to ensure the search process ends early only on positive matches. For example, the search-ending threshold may be set to 95%.

If the adjusted match score does not exceed the search-ending threshold ("NO" of 116), the search management module 81 determines whether the time or resources allocated to the search process have been exceeded (118). If time and resources allocated to the search process have not been exceeded ("NO" of 118), the search management module 81 determines whether there are additional unscored reference fingerprint templates in the first prioritized set of reference fingerprint templates (110). If there is an unscored reference fingerprint template in the first set of reference fingerprint templates, steps 110-118 recur with regard to a new selected reference fingerprint template. In some embodiments, use of the search-ending thresholds, resource limits, and time limits on the search process prevents the search process from taking so much time that the individual's experience is negatively impacted. In some embodiments, the search-ending thresholds, resource limits, and time limits are configured differently for different branches of the institution 4 and varied by search request based on factors such as transaction amount.

If there are no remaining unscored reference fingerprint templates in the first prioritized set of reference fingerprint templates ("NO" of 110), the search management module 81 determines whether the database 16 includes reference fingerprint templates in addition to those associated with the likely suspects (120). If the database 16 includes reference fingerprint templates in addition those associated with the likely suspects ("YES" of 120), the template search module 86 generates a second prioritized set of reference fingerprint templates (122). The second prioritized set of reference fingerprint templates includes the reference fingerprint templates in the database 16 that are not associated with the likely suspects. In various embodiments, the second prioritized set of reference fingerprint templates is prioritized based on various factors. For example, in some embodiments, the second prioritized set of reference fingerprint templates is prioritized by geographic region. In other embodiments, the second prioritized set of reference fingerprint templates is prioritized based on how frequently the reference fingerprint templates are associated with fraud.

After generation of the second prioritized set of reference fingerprint templates, the search management module 81 determines whether the second prioritized set of reference fingerprint templates includes any unscored reference fingerprint templates (124). Initially, each reference fingerprint template in the second prioritized set of reference fingerprint templates is unscored. If the second prioritized set of reference fingerprint templates includes an unscored reference fingerprint template ("YES" of 124), the match analysis module 88 calculates an initial match score by comparing the target fingerprint template and a selected reference fingerprint template (126). The selected reference fingerprint template is the highest-priority unscored reference fingerprint template in the second prioritized set of reference templates. The match analysis module 88 then adjusts the initial match score, thereby generating an adjusted initial match score for the selected reference fingerprint template (128).

After generating the adjusted match score, the search management module 81 compares the adjusted match score with the search-ending threshold (130). If the adjusted match score does not exceed the search-ending threshold ("NO" of 130), the search management module 81 determines whether the time or resources allocated to the search process have been exceeded (132). If the time and resources allocated to the search process have not been exceeded ("NO" of 132), the search management module 81 again determines whether there are any unscored reference fingerprint templates in the second prioritized set of reference fingerprint templates (124). If there is an unscored reference fingerprint template in the second prioritized set of reference fingerprint templates, steps 124-132 recur. In some embodiments, the steps 126, 128, 130, and 132 are performed in a similar way as the steps 112, 114, 116, and 118.

Once the search management module 81 determines that the search process is completed, either because an adjusted match score exceeds the search-ending threshold in steps 114 or 128, time or resources expired in steps 116 or 130, or there where no additional reference fingerprint templates in the database 16 in step 118, the search management module 81 updates the database 16 with information about the search process and results of the search process (134). In various embodiments, this information is used in various ways. For example, in some embodiments, the learning module 94 uses this information to improve system accuracy and performance. Furthermore, in some embodiments, this information is used for auditing purposes. In various embodiments, this information is stored in various ways. For example, in some embodiments, the database update is performed directly in each database record in the database 16. In other embodiments, the database 16 contains a separate table for tracking search results.

The search management module 81 then sends a search response to the workstation device 10 (136). In various embodiments, the search response includes various types of data. For example, in some embodiments, the search response includes the highest match score produced during the search process.

In addition to the search process described in detail in the preceding paragraphs, the FAS 14 receives post-transaction information from the workstation device 10 or other systems. In various embodiments, the post-transaction information includes various types of information and is used in various ways. For example, in some embodiments, the FAS 14 uses the post-transaction information to update the database 16 for fraudulent transactions detected after-the-fact. The fraud history module 82 uses information about fraudulent transactions detected after-the-fact. Furthermore, in some embodiments, the fingerprint analysis module 83 and the learning module 94 use fingerprint images in the post-transaction information to refine system performance and fingerprint templates.

Furthermore, in some embodiments, the cashier retains suspicious checks for further processing. An employee rescans all suspicious checks using an evidentiary-quality fingerprint scanner. The employee then adds the post-transaction information to the database 16. The post-transaction information includes information from each of the suspicious checks and transactions associated with the suspicious checks. In such embodiments, the post-transaction information may include: an image of the endorsement signature for future handwriting analysis, a capture of the MICR line of the check, information that associates the physical check with digital images of the check, information that identifies an identity token (e.g., a person's driver's license) used in a transaction that involved a suspicious check, or information captured at the time of the transaction, such as a photo record. By collecting the post-transaction information, the institution 4 may be able to build a case file suitable for supporting criminal prosecution as well as providing data which can be used to improve the accuracy of the FAS 14.

In some embodiments, the FAS 14 runs on a computing device with two or more central processing units. In such embodiments, the search management module 81 of the FAS 14 allocates one or more processing units to perform searching and matching operations in parallel. In such embodiments, the search management module 81 allocates the processing units based on the transaction parameters, policy settings, available resources, and workload. At least some of the steps of FIG. 5 can occur simultaneously on separate processing units. For example, step 110 may occur on two or more reference fingerprint templates simultaneously on separate processing units. For example, if the FAS 14 is running on a computing device with ten processing units, the FAS 14 is able to calculate initial match scores for ten reference fingerprint templates simultaneously.

Figure 6:
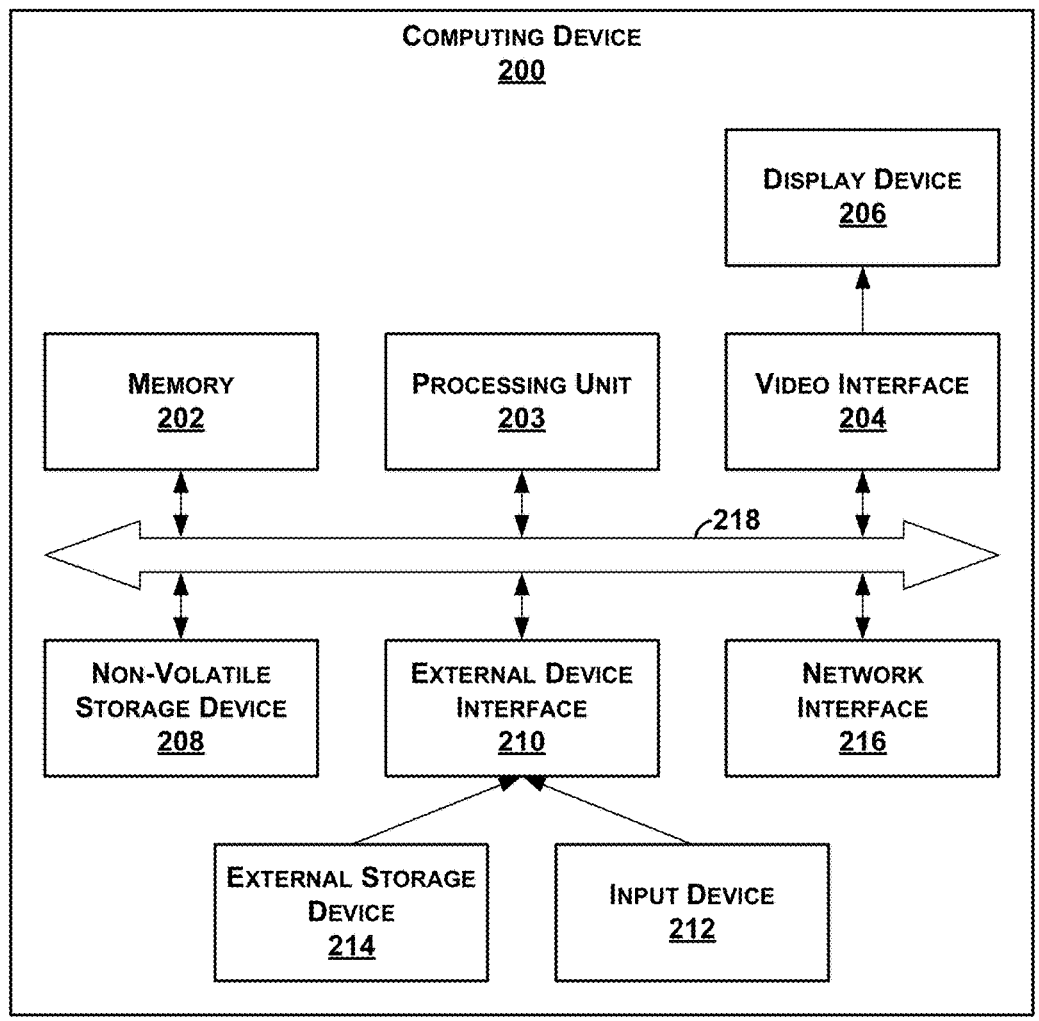
FIG. 6 is a block diagram illustrating example hardware components of a computing device.

FIG. 6 is a block diagram illustrating example physical components of a computing device 200. The computing device 200 may represent an implementation of the workstation device 10 and/or the FAS 14.

As illustrated in the example of FIG. 6, the computing device 200 comprises a memory unit 202. The memory unit 202 is a computer-readable storage medium that is capable of storing data and instructions. The memory unit 202 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the computing device 200 comprises a processing unit 203. In various embodiments, the processing unit 203 is implemented in various ways. In a first example, the processing unit 203 may execute software instructions that cause the computing device 200 to provide specific functionality. In this first example, the processing unit 203 may be implemented as one or more processing cores and/or as one or more separate microprocessors. For instance, in this first example, the processing unit 203 may be implemented as one or more Intel Core 2 microprocessors. The processing unit 203 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit 203 may be implemented as an application specific integrated circuit (ASIC) that causes the computing device 200 to provide specific functionality. In a third example, the processing unit 203 causes the computing device 200 to provide specific functionality by using an ASIC and by executing software instructions.

The computing device 200 also comprises a video interface 204 that enables the computing device 200 to output video information to a display device 206. The display device 206 may be a variety of different types of display devices. For instance, the display device 206 may be a cathode-ray tube display, an LCD display panel, a plasma screen display panel, a touch-sensitive display panel, a LED array, or another type of display device.

In addition, the computing device 200 includes a non-volatile storage device 208. The non-volatile storage device 208 is a computer-readable storage medium that is capable of storing data and/or instructions. The non-volatile storage device 208 may be a variety of different types of different non-volatile storage devices. For example, the non-volatile storage device 208 may be one or more hard disk drives, magnetic tape drives, CD-ROM drives, DVD-ROM drives, Blu-Ray disc drives, or other types of non-volatile storage devices.

The computing device 200 also includes an external component interface 210 that enables the computing device 200 to communicate with external components. As illustrated in the example of FIG. 6, the external component interface 210 communicates with an input device 212 and an external storage device 214. In one implementation of the computing device 200, the external component interface 210 is a Universal Serial Bus (USB) interface. In other implementations of the computing device 200, the computing device 200 may include another type of interface that enables the computing device 200 to communicate with input device and/or output devices. For instance, the computing device 200 may include a PS/2 interface. The input device 212 may be a variety of different types of devices including, but not limited to keyboards, mice, trackballs, stylus input devices, touch pads, touch-sensitive display screens, or other types of input devices. The external storage device 214 may be a variety of different types of computer-readable storage media including magnetic tape, flash memory modules, magnetic disk drives, optical disc drives, and other computer-readable storage media.

In addition, the computing device 200 includes a network interface 216 that enables the computing device 200 to send data to and receive data from the network 12. The network interface 216 may be a variety of different types of network interface. For example, the network interface 216 may be an Ethernet interface, a token-ring network interface, a fiber optic network interface, a wireless network interface (e.g., WiFi, WiMax, etc.), or another type of network interface.

The computing device 200 also includes a communications medium 218 that facilitates communication among the various components of the computing device 200. The communications medium 218 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 6 (i.e., the memory 200, the non-volatile storage device 208, and the external storage device 214). Together, these computer-readable storage media may constitute a single logical computer-readable data storage medium. In some embodiments, this single logical computer-readable data storage medium stores instructions executable by the processing unit 203. Actions described in the above description may result from the execution of the instructions stored on this single logical computer-readable data storage medium. Thus, when this description says that a particular logical module performs a particular action, such a statement may be interpreted to mean that the instructions of the logical module, when executed by a processing unit, such as the processing unit 203, cause the computing device 200 to perform the action.

Figure 7:
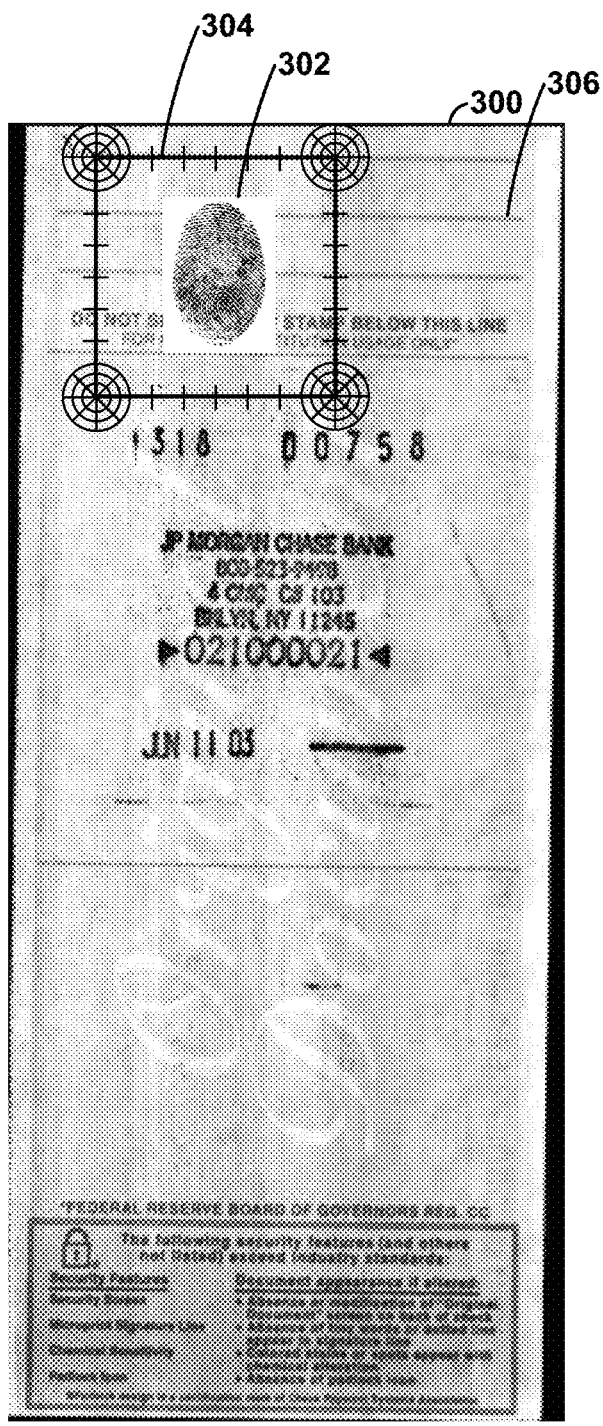
FIG. 7 is an image of a check onto which an individual has impressed a fingerprint.

FIG. 7 is a grayscale image of a check 300 onto which an individual has impressed a fingerprint 302. As illustrated in the example of FIG. 7, a fiducial mark 304 is applied to the check 300. As discussed above, the fiducial mark 304 can be used during image processing operations. Furthermore, the check 300 has background lines 306 in the endorsement area of the check 300. As discussed above, the background lines can be used during image processing operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A method comprising:
   receiving a digital image of a surface of a check, wherein a fingerprint is impressed on the surface of the check, the digital image including a fingerprint image;
   using the fingerprint image to determine an initial match score for the fingerprint;

calculating a fingerprint image quality metric of the fingerprint image, the fingerprint image quality metric being a number based on at least one or more changes made to the fingerprint image;

adjusting the initial match score based on the fingerprint image quality metric to create an adjusted match score; and presenting an alert based on the adjusted match score.

2. The method of claim 1, wherein presenting the alert comprises:

instructing a cashier to segregate the check for subsequent analysis when the adjusted match score exceeds an alert threshold; and instructing the cashier to complete a transaction involving the check when the adjusted match score is below the alert threshold.

3. The method of claim 1, wherein the digital image is a grayscale image.

4. The method of claim 1, wherein using the fingerprint image comprises applying one or more image processing operations to the fingerprint image.

5. The method of claim 1, wherein the one or more changes comprise applying one or more image processing operations that reduce artifacts caused by movement of the check through a check scanning device that generated the digital image.

6. The method of claim 4, wherein the method further comprises: detecting a fiducial mark on the check; and wherein applying the one or more image processing operations comprises using the fiducial mark during performance of at least one of the image processing operations.

7. The method of claim 4, wherein the fingerprint image quality metric of the fingerprint image is a measure of an expected accuracy in representing the fingerprint.

8. The method of claim 1, wherein using the fingerprint image further comprises:

using the fingerprint image to generate a target fingerprint template that represents the fingerprint; and calculating the match score by comparing the target fingerprint template and a given reference fingerprint template, the given reference fingerprint template representing the reference fingerprint; and wherein presenting the alert comprises presenting the alert when the adjusted match score exceeds an alert threshold.

9. The method of claim 1, wherein the method further comprises:

storing a plurality of reference fingerprint templates, each reference fingerprint template representing a fingerprint of a different person, the plurality of reference fingerprint templates including a reference fingerprint template representing the reference fingerprint; and wherein using the fingerprint image comprises:

generating a target fingerprint template of the fingerprint from the digital image; and calculating initial match scores by comparing the target fingerprint template with the plurality of reference fingerprint templates until a given initial match score is calculated that exceeds a search-ending threshold, the initial match scores representing approximate probabilities that the target fingerprint template matches the reference fingerprint templates; and wherein presenting the alert comprises presenting the alert when the given adjusted match score exceeds an alert threshold.

10. The method of claim 9, further comprising adjusting one or more of the initial match scores or the adjusted match scores based on a number of past false matches associated with a selected reference fingerprint template.

11. The method of claim 9, further comprising adjusting one or more of the initial match scores or the adjusted match scores based on a number of past false non-matches associated with a selected reference fingerprint template.

12. The method of claim 9, further comprising adjusting one or more of the initial match scores or the adjusted match scores based on a history of fraud associated with a selected reference fingerprint template.

13. The method of claim 9, further comprising adjusting one or more of the initial match scores or the adjusted match scores based on a chronology of fraud associated with a selected reference fingerprint template.

14. A computer-readable storage device comprising instructions that, when executed by a processing unit of a computing device, cause the computing device to:

receive a digital image of a surface of a check, wherein a check scanning device captures the digital image as the check moves through the check scanning device, wherein a fingerprint is impressed on the surface of the check and the digital image includes a fingerprint image;

use the fingerprint image to determine an initial match score for the fingerprint;

calculate a fingerprint image quality metric of the fingerprint image, the fingerprint image quality metric being a number based on at least one or more changes made to the fingerprint image;

adjust the initial match score based on the fingerprint image quality metric to create an adjusted match score; and cause a workstation device to present an alert when the adjusted match score exceeds an alert threshold.

15. The computer-readable storage device of claim 14, wherein the instructions, when executed by the processing unit, cause the computing device to:

generate a target fingerprint template that represents the fingerprint;

store a plurality of reference fingerprint templates in a database, each of the reference fingerprint templates representing a fingerprint of a different person, each of the plurality of reference fingerprint templates representing one of the plurality of reference fingerprints; and calculate the initial match score by comparing the target fingerprint template and the reference fingerprint templates.

16. The computer-readable storage device of claim 15, wherein the instructions, when executed by the processing unit, further cause the computing device to search the fingerprint templates in the database for the reference fingerprint that closely matches the fingerprint using a fingerprint analysis system.

17. The computer-readable storage device of claim 15, wherein the instructions, when executed by the processing unit, further cause the computing device to adjust the initial match score or the adjusted match score based on a number of past false matches associated with a selected reference fingerprint template.

18. The computer-readable storage device of claim 15, wherein the instructions, when executed by the processing unit, further cause the computing device to adjust the initial match score or the adjusted match score based on a number of past false non-matches associated with a selected reference fingerprint template.

19. The computer-readable storage device of claim 15, wherein the instructions, when executed by the processing unit, further cause the computing device to adjust the initial match score or the adjusted match score based on a history of fraud associated with a selected reference fingerprint template.

20. The computer-readable storage device of claim 14, wherein the instructions, when executed by the processing unit, further cause the computing device to:
   store a plurality of reference fingerprint templates;
   generate a target fingerprint template of the fingerprint from the digital image; and
   calculate initial match scores by comparing the target fingerprint template with the plurality of reference fingerprint templates until a given initial match score is calculated that exceeds a search-ending threshold, the initial match scores representing approximate probabilities that the target fingerprint template matches the reference fingerprint templates.

\* \* \* \* \*